United States Patent [19]

Ray et al.

[11] Patent Number: 4,590,336

[45] Date of Patent: May 20, 1986

[54] SPECIAL CIRCUIT TRANSFER VIA CABLE ANALYZER

[75] Inventors: Jimmy C. Ray; H. Wayne Mathews, both of Denison, Tex.

[73] Assignee: Communications Technology Corp., Los Angeles, Calif.

[21] Appl. No.: 669,767

[22] Filed: Nov. 8, 1984

[51] Int. Cl.$^4$ .............................................. H04B 3/46
[52] U.S. Cl. ................................................. 179/175.3 A
[58] Field of Search ................. 179/175.3 R, 175.3 A, 179/175.3 F, 175.25; 324/66

[56] References Cited

U.S. PATENT DOCUMENTS 3,975,600  8/1976  Marston ...................... 179/175.3 A Primary Examiner—Stafford D. Schreyer
Attorney, Agent, or Firm—Wendell Coffee

[57] ABSTRACT

A cable analyzer is capable of having at least 3 pairs of wire from telephone cables connected to the analyzer. By a central processing unit or computer in the analyzer, a series of relays connect any one of the pair of wires to a routing board. At the routing board, a plurality of analog tests may be directed to be conducted upon the pair of wires and ground, or the wires may be routed within the analyzer for other purposes. The results of the analog tests are converted to binary digital format so that they may be analyzed by the central processing unit. The results are visually displayed. The central processing unit has the capabilities, through different programs, to cause the analyzer to conduct a plurality of procedures upon each pair and to connect the pairs. Two analyzers, physically separated, are connected as master and slave so that the master analyzer controls the slave analyzer. One important procedure possible by the master/slave connection is the transfer of a communications circuit from an old section of a pair of wires in an old cable to a new section of a pair of wires in a new cable in less than 1 millisecond.

10 Claims, 6 Drawing Figures

SPECIAL CIRCUIT TRANSFER VIA CABLE ANALYZER

CROSS REFERENCE TO RELATED APPLICATIONS

This application is a companion to a patent application filed on or about Oct. 31, 1984, Ser. No. 666,836, and much of the disclosure of this application is a duplication of the disclosure in that application.

BACKGROUND OF THE INVENTION (1) Field of the Invention

This invention pertains to computer design. Applicant designates a computer design as one having ordinary skill in the art. Therefore, this application is written so that a computer design would be able to make and use the invention.

This invention is to be used with communication cables; and particularly is used to transfer special circuits for old cable to new cable.

(2) Description of the Prior Art

The normal telephone systems and networks were originally installed for voice communication by "plain old telephones". However, they have now come to be used extensively for special circuits. Some of these special circuits are called "T-circuits". Often, either very high frequency transmissions or high speed data is transmitted by these special circuits.

Whereas, for voice communication an interruption in service for a period of one second might have been tolerated, in the special circuits, a disruption of less than 1/100 of a second might cause serious commercial damage. Also, in many of these special circuits, the circuits are almost continuously in use. Normally, the cable includes many pairs of wire.

With the special circuits, it was not possible to bridge the wires in the customary fashion. I.e., if a pair of wires having considerable length were tapped into the cable, the capacitance of a pair of wires would be so great that the high frequency communication could not be conducted. Also, because of the high frequency, if a parallel path were established and one path were longer than the other, disruption would occur in certain instances because there would be a serious out-of-phase relationship in the high frequency transmission due to the longer length of one of the circuits. These problems are different from the problems that exist when the wires and cables are being used only for "plain old telephone service", i.e., voice communication.

The two wires of a pair are designated in the phone system as the ring and tip. One wire being the ring and one wire being the tip of each pair. It was known that various tests could be made; e.g., the voltage determined between the ring and tip, the ring and ground, and tip and ground. Also, in the absence of voltage, the resistance from ring to tip, ring to ground, and tip to ground could be determined.

Furthermore, equipment existed before this invention to measure the capacitance. The capacitance between the ring and tip could be measured. The standard wire in common use would have a certain capacitance of per thousand feed. Therefore, by measuring the capacitance between ring and tip, a measurement could be obtained of the total length of wire. If the capacitance from ring to ground did not equal the capacitance from tip to ground, this difference indicated that the pair was unbalanced.

Furthermore, it was known, because of certain external conditions, the voltage of the wires would vary on an instantaneous basis. Therefore, for accuracy, no reading should be instantaneous, but the average of multiple readings. Of course with structural devices, such as a volt meter having a needle indicating the volts, the inertia of the physical parts act as to average the reading inasmuch as the change in voltage would be so rapid that the needle could not physically move, but because of inertia, would average the instantaneous values.

SUMMARY OF THE INVENTION (1) New Functions and Surprising Results

This invention uses a cable analyzer which is unique in several respects.

Three single pair jacks or receptacles for cords are on the analyzer. One receptacle is black and identified as an old receptacle for an old pair, another is white and identified as a new receptacle so named to be connected to a new pair. The third is black and white, or gray and called the TCX receptacle, being an abbreviation for "T-circuit" transfer. Sometimes in this application, the TCX will be referred to as the reed connection, because in the program it is connected to the reed of the transfer relay.

The analyzer is computerized so that a series of procedures may be conducted. I.e., the panel has a 16 key input board. By keying two keys, a particular program may be used which, for example, would conduct a transfer.

Two analyzers may be connected together and programmed so that one is a master analyzer and the other is slave. With this, the two analyzers could be physically remote apart, and particularly, one of the analyzers be at the master end of a section of cable and the other at the slave end of a section of cable. Then, one analyzer could put a tone on a pair of wires and a +10 volts D.C. potential on the ring and a −10 volts D.C. potential on the tip. Therefore, if the other analyzer received the tone and measured the voltage as +10 volts ring and −10 volts tip, it would be certain that the two analyzers were connected to the same pair. Also, if a tone were transmitted at the transmitting analyzer, the amplitude and power could be measured on the pair at the transmitting analyzer. If the amplitude and power were the same at the other analyzer, it would be an indication that all connections between the two analyzers were good electrically. The tone normally used for such a test is 577 Hz. Also, it is known that this tone can be transmitted in simplex form and not interfere with the special usage of even the special circuits.

Also, since the two analyzers are connected together, an instruction sent from the master analyzer to move relay reeds from an old connection to a new connection will be made almost simultaneously by the two analyzers. Of course, the slave analyzer might be a microsecond or so behind the other analyzer because of the time for the data to move along the wire. With these capabilities, it may be seen that if the old pair were connected to old poles of the transfer relay at both ends of the section, and the new pair were connected to the new poles at both analyzers, that a command could be sent from the master to move the circuit from the old pair to the new pair. The move would be done in a very short period of time. That time being the length of time for the electrical transmission from one analyzer to the other and for the reeds of the relay to move from one pair of poles to the other.

Then, as soon as the transfer is made, a test could be made to see if both analyzers were connected to the same old wire. If the analyzer were not connected to the same old wire, it would mean that the circuit had been disrupted, and then the master could direct both relays to move again to the old pole pairs of the relay. The circuit could be moved from the old circuit to the new, the old cable analyzed, and if in error, moved back to the original condition.

Many of the different tests are performed by the analyzer (such as voltage, resistance, and capacitance) are conducted as analog tests, and therefore, it is necessary to translate or change the analog information into binary digital form. Central processing unit, (called CPU herein) besides having the programs on "programmable read only memory" units (called PROM); also has memory units as "random access memory" (called RAM).

In addition to having the RAMS, PROMS and integrated circuit, the CPU will also have a clock. In addition to the computer control, the clock will also generate a 612 KHz signal and a 4.8 KHz signal which will be transmitted to various components of the analyzer such as a converter, where the analog to digital conversion takes place as well as other functions.

As a result of these capabilities, the analyzer can make and perform numerous tasks and print out the results or the conclusion of these many tasks in written form in much shorter time than they could be performed otherwise.

In addition, according to this invention, the analyzer itself, is only 22" (55.88 cm) wide by 8" (20.32 cm) high and 10.5" (26.67 cm) deep. The entire unit weighs only 28 pounds (12.7 Kg.) including the rechargeable battery power supply.

(2) Objects of this Invention

An object of this invention is to transfer circuits from an old wire pair to a new wire pair.

Further objects are to achieve the above with devices that are sturdy, compact, durable, lightweight, simple, safe, efficient, versatile, ecologically compatible, energy conserving, and reliable, yet inexpensive and easy to manufacture, connect, adjust, operate and maintain.

Other objects are to achieve the above with a method that is rapid, versatile, ecologically compatible, energy conserving, efficient, and inexpensive, and does not require highly skilled people to connect, adjust, operate, and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENT

Figure 1:
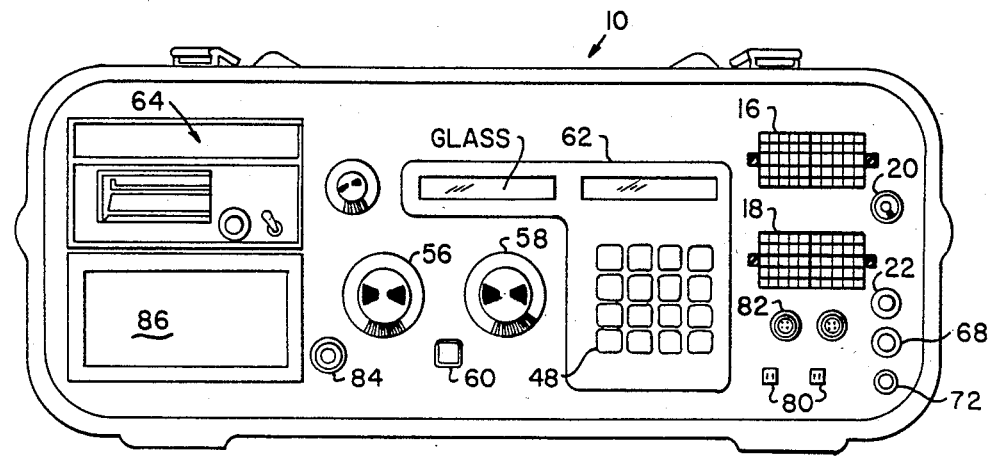
FIG. 1 is a front elevational view of the front panel of one of the cable analyzers.
Figure 2:
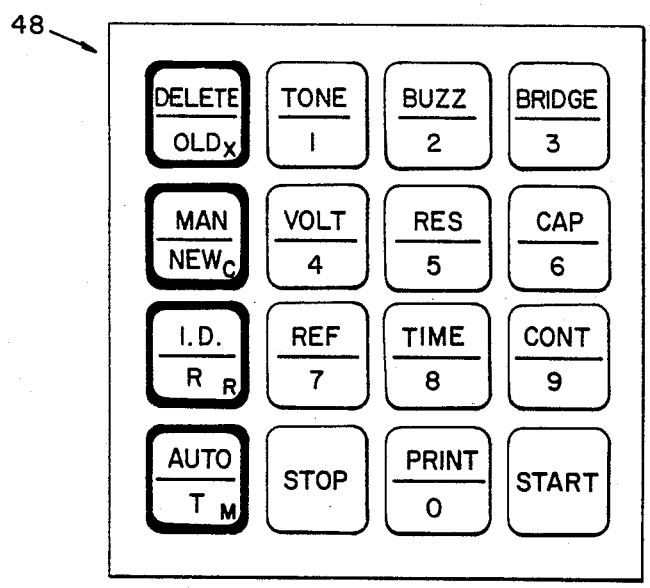
FIG. 2 is a front elevational view of the 16 key pad.
Figure 3:
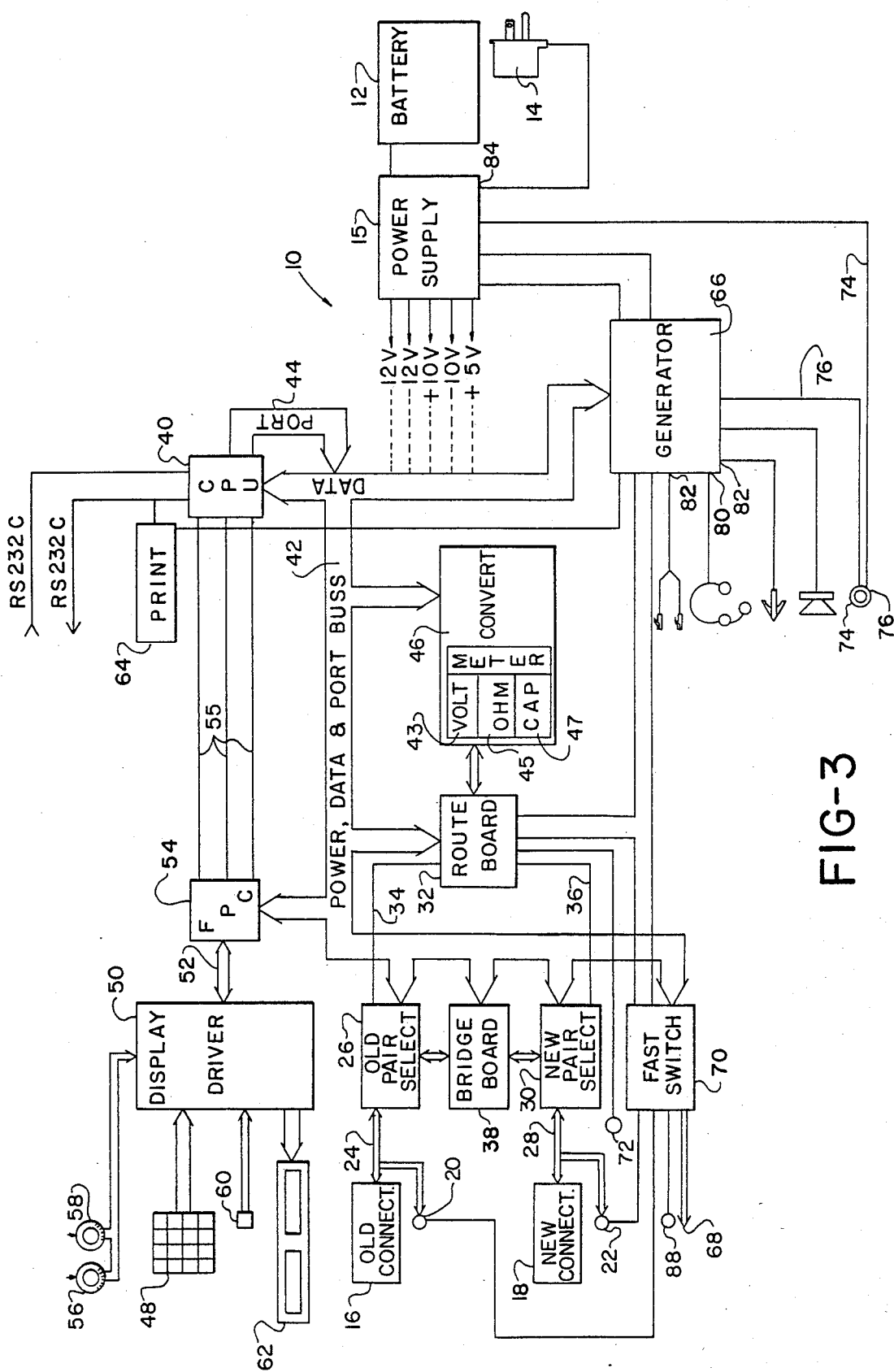
FIG. 3 is a schematic representation of the operation of one of the cable analyzers.

Referring to the drawings, and more particularly to FIGS. 1 and 3, there may be seen cable analyzer 10. The analyzer will include batteries 12 which may be recharged by plug in wall transformer 14 through power supply 15. The analyzer will have a 25 pair plug connector which is designated as the old module or old plug connector 16. It generally bears the designation of "Cinch Jones". There is also a 25 pair connector designated as the new plug connector 18 which again is a 50 pin connector. In addition to the 25 pair connectors, there is a single jack or old receptacle 20 to connect a single pair as well as a single pair new receptacle 22.

The pins of the old connector 16 and old receptacle 20 are connected by hardwiring or old ribbon 24 to an old pair selector board 26. Likewise, new connector 18 and new receptacle 22 are connected by a new hardwire ribbon 28 to the new pair selector board 30. Each pair selector board has 26 double pole relays. Both these relays, any one of the pairs in either the old connector 16 and old receptacle 20 may be connected to routing board 32. The connection of one of the pairs from the old connector or old receptacle to the routing board is by old buss 34, as shown. Likewise, the connection between the relays of the new pair selector and the routing board is by the new buss 36.

Bridge board 38 connects both to the old pair selector 26 and the new pair selector 30. It has 26 double pole-double throw relays. By the bridge board 38, any pair from the old connector 16 can be connected or bridged to the corresponding pair of the new connector 18. Also, old receptacle 20 can be connected to new receptacle 22.

Central processing unit 40 (called CPU herein) controls the pair selection and routing, and basically all other functions of the analyzer. Besides the basic integration circuit, the CPU will include a plurality of PROM units which will contain the programs for the analyzer. It will also contain several RAM units. Also, a clock in the CPU produces 612 KHz and 4.8 KHz signals for the various components. The CPU 40 is connected by both data buss 42 and port buss 44 to the old pair selector 26, the new pair selector 30, the bridge board 38 and the routing board 32. It is by operation of the CPU 40 that a particular pair is selected to be connected by relay to the routing board. The CPU signals the particular test to be performed upon them. Also, it is the signal from the CPU 40 that directs the individual relays in the bridging board 38 to bridge one of the pairs from the old connector 16 to the corresponding pair on the new connector 18.

The routing board 32 is connected by a plurality of connectors to analog to binary digital converter 46. The converter 46 does more than merely convert, it processes analog signal. For example, normally the first test which is made upon a pair as determined by the CPU 40 is to measure, by volt meter 43, the voltage from ring to ground, tip to ground, and ring to tip. Therefore, after the CPU has directed the converter 46 to make the voltage readings, these voltage readings are converted and are stored in the RAMS of the CPU 40. Then the voltages are analyzed by the CPU and compared to certain standards as contained in the PROMS. Likewise, ohmmeter 45 of the converter 46 would, upon proper command or direction from the CPU 40, determine the resistance of a designated pair between ring and ground, tip and ground, and ring to tip, convert this information to binary digital code to be transmitted to the CPU for storage and analysis. Likewise, capacitance meter 47 would make capacitance tests, ring to ground, tip to ground, and ring to tip, to be converted to binary digital code, analyzed and stored.

The routing board 32 does more than merely route a pair (for example, pair number 7 as it might be designated inasmuch as the pairs in each group are designated from pair 1 through pair 25, ordinarily). The routing board, besides picking out one particular pair, would also route it to the particular meter, either the ohmmeter 45, volt meter 43, or capacitance meter 47 as directed. Also, it would indicate in its routing whether the measurement was to be ring to tip, ring to ground, or tip to ground.

The main input by the operator to the CPU 40 is by sixteen membrane key pad 48. The key pad is connected to display driver 50, and from there, by 40 pin ribbon 52 to front panel control 54. The front panel control is connected by the data buss 42 and port buss 44 to the CPU. Front panel control 54 is also connected to the CPU by a plurality of hard wires for standby power and reset and low battery.

In addition to the 16 key pad 48, there is an old pair selector switch dial 56 and a new pair selector switch dial 58. By these dials, manually, any pair on the old connector 16 or receptacle 20 or any pair on the new connector 18 or receptacle 22 may be manually selected for tests.

In addition, on the front panel there is a reset membrane switch 60 which is connected through the display driver 50 and front panel control 54 and hardwire 55 to the CPU 40.

The display driver 50 is also connected to visual display board 62 which is in the form of a dual or two panel eight character liquid crystal display alphameric.

Thermal printer 64 is connected directly to the CPU 40 and also to generator 66. The generator has the capabilities of generating dual tone multiple frequency (called DTMF dial tones herein).

According to the known usage, a 577 Hz the tone, as generated in the converter circuit 46, can be sent in a simplex mode so it is inaudible to someone using a telephone upon the line, but still can be distinguished by probe plugged in probe receptacle 68. The 577 Hz simplex also does not interfere with special circuit transmissions. Probe receptacle 68 is connected to amplifier circuit or fast switch circuit 70 which is also connected to the generator 66. The fast switch circuit 70 also has switching capabilities and is connected to the old receptacle 20 and the new receptacle 22.

Ground lug 49 is connected directly to routing board 32.

On/off switch 74 is combined with volume control 76. Volume control 76 is connected to the generator 66. The on/off switch 74 is connected to the power supply and charger 15 which interconnects the battery pack 12 and the wall transformer 14. The wall transformer 14 for the batteries 12 is connected to the battery charge receptacle 84. The power supply 15 is connected to the different elements of the analyzer 10 requiring power.

Talk lugs 80, upon the front panel, are connected to the generator 66. In addition, there is a four prong talk and data receptacle 82. Both the head set for the talking and the data connectors are connected to the generator 66. Cord storage pocket 86 is within the front panel of the analyzer 10. TCX receptacle 88 on the front panel is connected to the fast switch circuit 70.

EXAMPLE OF FUNCTION

To give an example of certain functions of the system, a pretest program will be described. The pretest is to obtain information about the D.C. voltage, resistance and capacities of the wires and pairs within a 25 pair group in the cable. The pretest is useful prior to a cable transfer so that working, faulty, or vacant pairs are readily identified.

To perform a pretest, a group of wires terminating in a modular connection is connected to the old connector plug 16. The analyzer 10 is grounded, by connecting ground lug 72 to the cable sheath. Then, with the set on, the operator presses the key pad marked "AUTO" as seen in FIG. 3 and then presses the key pad marked "1" as seen in FIG. 3. Then, the operator would press the key pad marked "PRINT". The pressing of the key pads "AUTO, 1" would bring up on the CPU the proper program which is stored in the PROMS to conduct the automatic pretest program. Pressing the key pad "PRINT" would command the CPU to print the results of the test.

As the first function of the "AUTO, 1, PRINT" program, the CPU would cause to be displayed upon the old portion of the visual display board 62 "CABLE 00". The operator could key the numbers "03" indicating that the test was being made on cable 03. Then, the CPU would store this information on one of the RAMS. Then, the operator would press "START". Then, the new display of the visual display board 62 would read "CABLE 00". There being no new cable, the operator would press "START" again. The CPU would cause the old display to read "CNT 0000". The operator would enter the count, e.g., "01". The operator would then press "START" again. The new display would read "CNT 0000" since there was no new cable plugged into the new pair selector board 30, the operator would press "START" again.

Figures 4, 5:
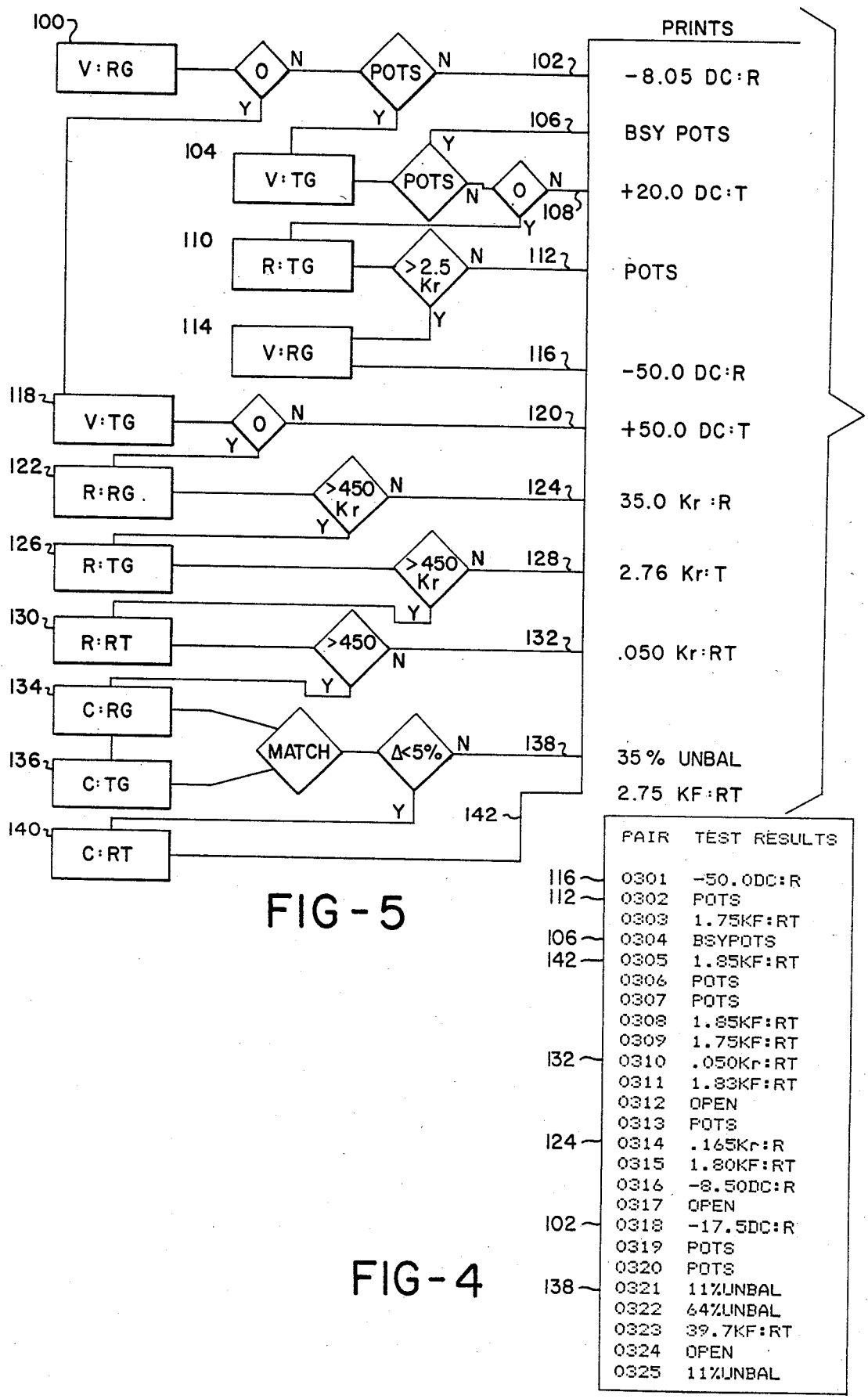
FIG. 4 illustrates an example of the tape printed from the pretest program.
FIG. 5 is a representation of the steps taken in a pretest program.

The steps hereinafter are represented in FIG. 5 and identified by numerals.

With this "START", the CPU would direct the old pair selection board 26 to connect the first pair as identified on the "Cinch Jones" connector 16 to the routing board 32. The CPU 40 would direct the routing board to connect the ring and ground to the volt meter 43. The CPU would direct the converter 46 to make multiple instantaneous readings (step 100) of the voltage from ring to ground and take the average of these voltages. The reading from the volt meter 43 would first be an analog signal related to a selected pair. The analog signal will be converted to a binary digital signal for use by the CPU. The CPU would determine if the voltage were zero. If the voltage were zero, a further test would be made, but if the voltage were not zero, then it would be determined if the voltage were within the POTS parameter (that is about −50 volts). If it were, the CPU would put this information in memory and proceed to check further for POTS parameter. On the other hand, if the voltage were present ring to ground, but this voltage did not match the parameters of a POTS, it would print (step 102) the voltage of the ring to ground and proceed to the next pair. Anytime the result is printed by the printer, then the test would proceed to the next pair.

Next, the CPU 40 would instruct the routing board 32 to connect the tip and ground to the volt meter 43, and the converter 46 to check the voltage tip to ground (step 104). There would be multiple voltage tests and the average taken by the CPU 40. The CPU would determine if the voltage were in "busy POTS" parameter. If the voltage between tip to ground were in the busy POTS parameters (that is about −14 volts) it would then identify the pair as a busy POTS, print the pair number on the tape with the identification of "busy POTS" and proceed to the next pair (step 106). The CPU would determine if the voltage were zero. If the voltage, tip to ground, were not zero, this voltage would be printed (step 108). If the voltage between the tip and ground were zero (0), the the CPU would instruct the converter to measure the resistance between tip and ground (step 110). The CPU would determine if the resistance was greater than 2.5K ohms. If the resistance were in the parameters of an idle POTS, i.e., less than about 2,500 ohms, the CPU would identify the pair as an idle POTS and cause the printer to print the line number and "POTS" and then proceed to the next pair (step 112).

If the tip to ground resistance were greater than about 2.5K ohms, then the CPU would command the routing board to again check the voltage ring to ground (step 114). Then, this voltage would be printed (step 116) and the CPU would go on to the next pair.

If there were no voltage on ring to ground, the CPU 40 would instruct the routing board 32 to connect tip and ground to the converter 46 and voltage would be checked between tip and ground (step 118). If the voltage between tip and ground were not zero, this voltage would be printed (step 120).

If there were no voltage, either ring to ground or tip to ground, then the resistance would be measured between ring to ground (step 122). The reading of the ohmmeter 45 will be an analog signal related to a selected pair. The analog signal will be converted to a binary digital signal for use by the CPU. If this resistance were below about 450K ohms, the resistance value would be printed (step 124) and the CPU would go onto the next pair.

If the resistance value were greater than about 450K ohm, then the CPU 40 would direct the routing board 32 to connect the tip and ground to the ohmmeter 45 and the ohmmeter to measure the resistance of the tip to ground (step 126). Again, if it were below about 450K ohm, the value would be printed (step 128).

If the resistance were above about 450K ohms, the CPU would direct the board to connect the ring and tip to the ohmmeter 45 and the resistance read (step 130). If there were resistance to ring and tip below about 450K ohm, this value would be printed on the tape and the CPU would go onto the next pair (step 132).

If the resistance were above about 450K ohm, the CPU would direct that the ring and ground be connected to the capacitance meter 47, and the converter 46 to conduct a capacitance test (step 134). The reading from the capacitance meter 47 will be an analog signal related to a selected pair. The analog signal will be converted to a binary digital signal for use by the CPU. This capacitance would be stored in memory, and then the CPU would direct the routing board to connect the tip and ground to the capacitance meter. The CPU would direct the converter to determine the capacity tip to ground (step 136), and then this value would be compared at the CPU 40 to the value of the capacitance ring to ground. If they were not about the same value (the difference less than about 5%), the percent of unbalance between these capacitance values would be printed on the tape, and the CPU would go to the next pair (step 138).

If the capacitance were about the same value, then the CPU would direct the routing board to connect the ring and tip to the capacitance meter 47, and the capacitance determined between ring and tip (step 140). This value would be converted at the CPU into an equivalency of thousands of feet and this value printed on the tape, and the CPU would go to the next pair (step 142).

Referring to FIG. 4, pair 1 shows that there was −50 volts between ring and ground. However, the assumption is that the tip parameters were not that of POTS. The −50 volts ring to ground indicates certain special circuits.

Pair 2, 6, 7, 13, 19, and 20 shows POTS. Pair 4 shows a busy POTS.

Pair 3 and several of the others show a length in 1,000 feet (KF.) between the ring and tip (RT.). Therefore, the analyzer shows that the length of the pair 3 line is 1,750 feet. Also, this means that there are no voltages and all resistances are greater than 450,000 ohms.

Pair 10 shows that there is a resistance ring to tip of 50 ohms (K=1,000; r=resistance in ohms). This indicates that there is a short between the ring and tip. With the knowledge of the gauge of wire being used, the distance to the fault could be calculated.

Pair 12, 17, and 24 indicate open line. This means there are no voltages and all resistances are greater than 450,000 ohms. This means that the capacitance meter indicated the length of the line was very short, meaning that probably the pair open within a few feet of the test set.

Pair 16 and 18 show a rather low voltage ring to ground. This probably indicates some special circuits such as an alarm system upon the line.

Pair 21, 22, and 25 show an unbalance of 11%, 64%, and 11% respectively. This indicates that the line is vacant, no voltage, high resistance, but with some problem on the line to cause the capacitance of the ring and tip to be different or that there is possibly a special circuit with no battery on the pair.

Those with ordinary skill in the art will understand that a group could be connected into the new pair connector 18 and a test made from there. Also, groups of 25 pair each could be connected both to the old and new and after the old 25 pair were tested, then the new 25 pair could be tested. Furthermore, instead of printing the results that the results of the the tests of each pair could be visually displayed, however, for automatic testing this would be perhaps too rapid to be checked, and therefore it would be better that this being done manually. Manual testing could be done whereby the operator would press the "MANUAL" pad and then manually select the pair by the dial indicators 56 and 58 on the front panel. The operator would press "START" for each pair which would then display the results as indicated above upon the visual display board. Also, it would be understood by one with ordinary skill in the art that instead of making the entire pretest that at any time desired that any one value such as voltage, resistance or capacitance could be read upon any individual pair.

Furthermore, it would be understood that by use of the capabilities of the unit that results could be transmitted to a remote location. The analyzer could be controlled by a remote location.

Also, actually, the example of the measuring the voltage would be as indicated above that there would be a repeated measurement of the instantaneous voltage by the volt meter 43 in the converter 46. Then each of the values would be converted to binary digital form to be put to the CPU where the several values would be stored in memory. Then, upon the completion of the multiple tests, they would be averaged. Likewise, multiple resistance readings would be taken, converted to binary digital mode, sent to the CPU, stored in memory, then called up to be averaged and used. The same is also true for the capacitance test. Multiple instantaneous readings are made, converted, stored, and averaged.

Special Circuit Transfer

Figure 6:
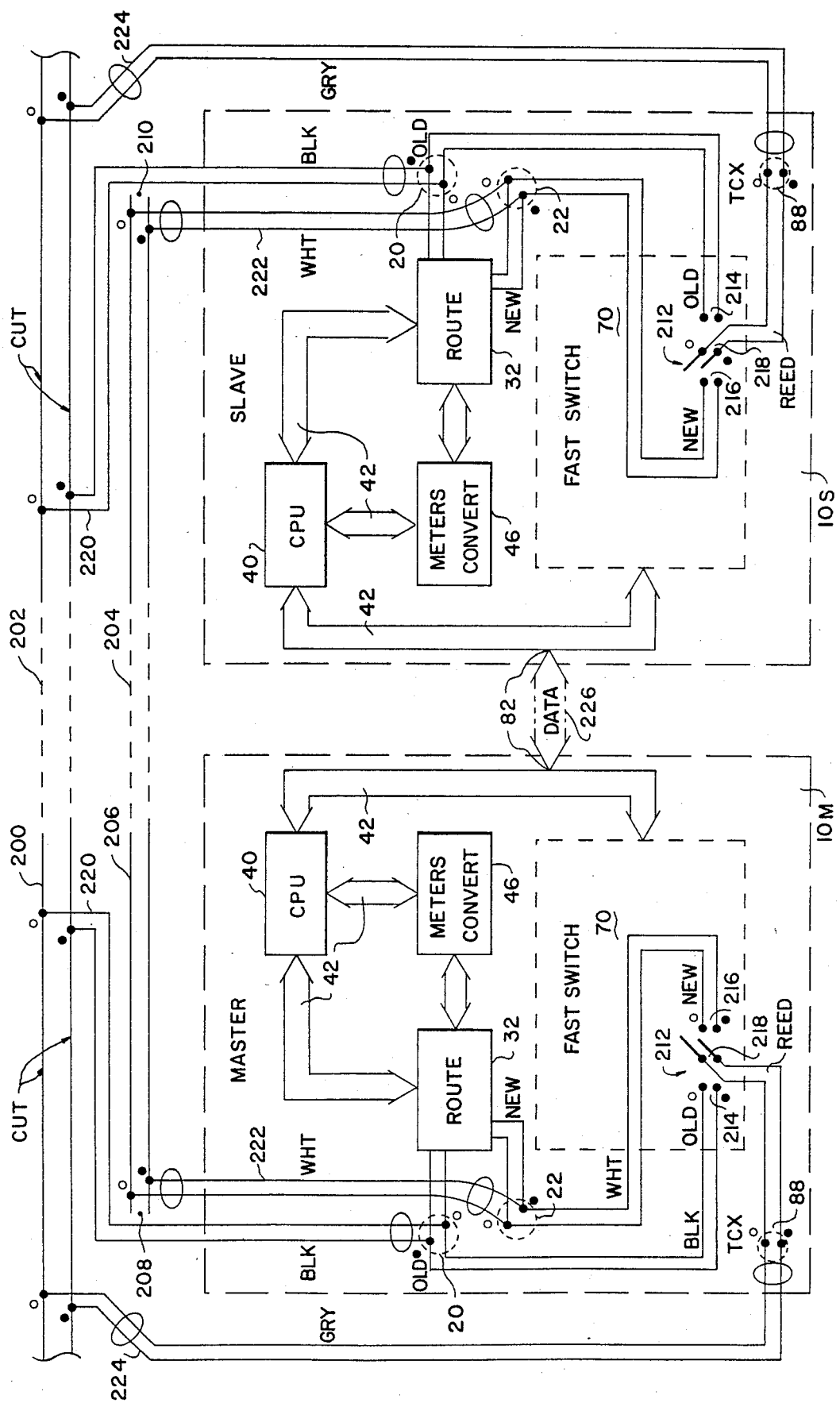
FIG. 6 is a simplified schematic representation of two analyzers used for special circuit transfer.

The equipment used in the transfer program is shown in FIG. 6. Two analyzers, 10M and 10S, basically as described above, are used. Old pair 200 with a certain old section 202 are in an old cable. According to this example, this transfer is being made so that new section 204 of new pair of wires 206 in a new cable may be put into service and the old section 202 be taken out of service. The terms "old" and "new" are being used herein, not to indicate age. By "old", it is meant that this pair of wires or cable is being removed from service, and by "new", it is meant that this pair of wires, not previously in service, is being placed in service.

For the purposes of convenience, the area wherein the one end of the new pair ends will be referred to as the master end 208. Master analyzer 10M will be located at this area which will be adjacent to the old pair 200 at this area. Likewise, the other end of the new pair 206 will be designated as slave end 210, which will likewise be adjacent to the old pair 200. The slave analyzer 10S will be located at this area.

The fast switch circuit 70 will include double pole-double throw relay 212. One pair of the poles will be identified as old poles 214, inasmuch as they are connected in the analyzer to old receptacle 20, which is marked with black for identification. Likewise, the other pair of poles of the double pole-double throw relay 212 will be designated as new poles 216, inasmuch as they are connected by internal wiring to the new receptacle 22 marked white for identification. Reed contacts 218 of the relay 212 are connected to the TCX or reed receptacle 88.

FIG. 6, for conciseness and clarity, does not show the entire analyzer. Each of the analyzers will be the same as that shown in FIG. 3, but certain elements have been omitted inasmuch as they have already been explained or they are not necessarily used in the special circuit transfer. Even if they are used, their use and operation is so obvious, that it was felt that there would be greater clarity to simplify the graphic representation. E.g., the selector boards 26 and 30 have not been shown, since for the entire program, the old receptacle 20 is connected to the routing board 32 as is the new receptacle 22. Therefore, for clarity and simplicity, these were shown as a direct connection from the receptacles 20 and 22 to the routing board 32. The meters and converter board 46 are shown as before. Also shown in FIG. 6 is the CPU 40 which is connected by the data and port buss 42 to the fast switch circuit 70, the routing board 32, and the meter and converter board 46.

Under normal circumstances, the master analyzer 10M will be physically at a considerable distance from the slave analyzer 10S. So that the two analyzers can function in many regards as a single unit, they are connected by data link 226. This data link is provided by connecting the data portion of the talk and data receptacle 82 to an otherwise vacant pair of wires which extends within the new cable through the new section 204. Although the connection may not be direct, the data link 226 connects the two CPUs together so that particularly, the directions from the master CPU 40 can be transmitted to the slave CPU. A splicer will be at each end, which for convenience will be referred to as the master splicer and the slave splicer. Also, so that they may communicate, a talk circuit is established between them, this by connecting the talk clips to an otherwise vacant pair of wires from the talk half of the receptacle 82. For this operation, it is necessary that both of the analyzers be well grounded or bonded to the sheath of the cable, as before, by ground lug 72.

To make the transfer, old or black cord 220 is connected to the old pair 200 on both the master and slave end. The black cord 220 is inserted into the old receptacle 20. Likewise, new or white cord 222 will be plugged into the new receptacle 22, and both the cord and the receptacle will be marked white for identification. It is imperative that all of the connection be made so that the ring and tip are always identified and correctly oriented. In FIG. 6, the ring wire or connections are identified by a small circle and the tip wire or connections are identified by a dot.

With the relay 212 in the position connecting the old receptacle 20 to the reed receptacle 88, the reed cord 224 from receptacle 88 is connected to the old pair 200 outboard of the connection 220. The term outboard is used to indicate that it is further from the section 202, which is to be removed from the old cable. It is necessary that the distance between the inboard connection of old cord 220 and the reed cord 224 be sufficient so that there is sufficient wire to splice the old wires still connected to the reed cord 224 to the new pair 206. The connection of the reed cord 224 is made by both the master and the slave. Then, with the reed still connecting to the old, then new cord 222 is attached to the new pair 206.

As soon as the old cords 220 and the new cords 222 are connected and the relay 212 connects the reed contacts to the old poles, the old wire pair is cut between the cords 220 and 224. The cut is made adjacent to old cord 220. With these steps completed, the transfer is made by the master analyzer 10M. Specifically, the master CPU 40 gives the command or direction for both the relay 212 in the master analyzer 10M and the relay 212 in the slave analyzer 10S to move from the old poles 214 to the new poles 216. This movement will be very fast, taking less than 1 millisecond. Also, it will be simultaneously, or nearly so. It will be understood that if the master and slave are located a considerable distance from one another, it will take a few microseconds for the electrical signal, even moving at the speed of light, to move from one to the other. However, with this tolerance, the relays will make the transfer at the same time. Therefore, it is only when the reeds are moving from one contact to another, that there will be any interruption in the circuit.

Inspection will show that before the transfer and after the wires have been cut, the circuit was from the old pair 200 on the master end through reed cords 224, the master relay 212 and back to the old pair 200 through the black or old cord 220. After the transfer is made, the circuit goes from the old pair 200 through the reed cord 224, through the relay 212, and back through the new cord 222, to the new pair 206, through the new section 204, to the slave unit in reverse order. I.e., at slave, through cord 222, relay 212, cord 224, to the old pair 200.

After the transfer is made, then the old pair as connected to reed cord 224 would be spliced to the new pair 208 at the master end, and also the old pair at the reed cord 224 would be spliced to the new pair 206 at the slave end 210.

If all of the connections were correctly made and were good electrically sound connections, the above procedure would be all that was needed. However, it is highly desirable that many checks be made. Perhaps one of the more important checks is to make for sure that the master cords 220 and 224 were connected to the same old pair 200 as the slave cords 220 and 224. After the transfer is made, this can be verified with a high degree of certainty and very rapidly by the master CPU directing the slaves meter and converter 46 to put a D.C. voltage between the ring and tip and a tone between the ring and tip. E.g., we prefer to put a +10 volts potential on the ring to ground, a −10 volt potential tip to ground, and a simplex 577 Hz tone ring to tip. This is conducted by the analyzer circuits previously described, inasmuch as the old receptacle 20 is connected to the sleeve routing circuit 32 which has available, all of the identifying tones and voltages. Then, the master, looking at its old receptacle 20, can see if it receives the same +10 volts, −10 volts, and simplex 577 Hz tone. The amplitude of the tone at the slave can be measured and the amplitude of the tone of the master can be measured, and the comparison of these measurements be made by the master CPU. If the match is made, then it would be assured that the pair 200 in section 202 had been taken out of the old cable and that the cord 220, master and slave, were connected to the same pair.

If there were not a match on the test of the old receptacles 20, then the master CPU immediately commands the voltages and tones be disconnected and both the relays 212, master and slave, to reconnect the circuit to the old pair 200. This is an important safeguard inasmuch as sometimes the special circuits will use a four wire circuit and sometimes there will be another pair of wire in the old cable that very much resembles the pair 200 which was desired to be transferred. I.e., the master might be on one pair of the four wire circuit and the slave be on the other pair of the four wire circuit. Therefore, if such were to have happened, the mistake can be discovered and the circuit restored.

It will be understood that the description of the operation, in some regards, is simplified and not particularly the exact procedures that are followed in the commercial models. However, for purposes of clarity and conciseness, they have been simplified. Yet, they are complete so that anyone having skill in the art could make and use, and practice the invention.

The entire program has many safeguards and helps, and therefore a somewhat detailed description is made of the entire program. Even this detailed description is somewhat simplified as identified above.

Also, as indicated above, this is a companion application to another application to which a copy of the operating manual procedures was attached as an appendix, which describes the commercial application and procedure.

As a detailed description of the operation, reference is made to FIGS. 1, 2, 3, and 6.

As indicated above, both the master and the slave analyzers are grounded by the ground lug 72 to the cable sheath. The data cords, master and slave are connected to an otherwise vacant pair of wires 226 in the new cable through section 204. The talk cords are connected, master and slave, to an otherwise vacant pair in section 204 of the new cable. The slave splicer keys in ID, 2, START, upon the slave analyzers key pad 48. The master splicer will key in ID, 2, AUTO, on the master key pad 48. The keying of START on the slave and AUTO on the master establishes which of the analyzers is master and which is the slave.

After the analyzers are turned on, and after the data link has been confirmed as correctly connected, the master analyzer will display "WANT TO IDENTIFY", and the slave analyzer will display "PLEASE STAND BY". The master splicer will press the "START" key to proceed to identify. Then, according to the program brought up by the ID, 2, AUTO, the master analyzer will display, "CONN BLK TO NEW", meaning black cord to new, while the slave analyzer will still say "PLEASE STAND BY". The master splicer will connect the black cord 220 extending from old receptacle 20 to the new pair 206. Upon completion of that, he will press the "START" key. At that time, the master CPU will turn on a tone upon the master set which is applied through the routing circuit to the old receptacle 20, and thus to the old pair of the cable to which the cord is applied. It will also activate the probe in the in the receptacle 68 at the slave and display "IDENTIFY NEW" on both the master and slave analyzer. The slave splicer will use the probe to identify the new pair and press "START". The master splicer will also press the "START" key, and both the master and slave analyzer will display "PLEASE STAND BY". Then, the CPU will direct that the tone be turned off at the master and the probe be deactivated at the slave. After this is completed, the master analyzer will display "CONN BLK TO OLD" while the slave analyzer continues to display "PLEASE STAND BY".

The master splicer will then take the black cord 220, still connected to the old receptacle 20 connect it to the old pair 200. Upon completion of that task, he will press the "START" key. This will cause the CPU to activate the tone upon the master set to the cord 220 and to activate the probe receptacle 68 at the slave. Also, it will cause both the master and slave analyzer to display "IDENTIFY OLD". The splicer will then use the probe to identify the old pair. As discussed above, this is not a fool proof identification, but the pair that will be identified by the slave will be the one which the slave splicer believes to be the pair to which the master splicer has attached the black cord onto.

Upon the completion of the task, and when both the slave splicer and master splicer have pressed the "START" key, both the splicer and slave analyzer will display "PLEASE STAND BY" and the program will cause the tone to be turned off at the master and the probe to be deactivated at the slave. Then, both analyzers will automatically display "CONN TCX AND OLD" which means "connect the TCX cord and the old cord".

If, at the time the master analyzer displayed "WANT TO IDENTIFY", the master splicer had keyed "STOP", this would have caused the program to advance to the point where both the analyzers displayed "CONN TCX AND OLD".

When the analyzers displayed this, both the master and the slave splicer connects the old cord 220 to the old pair inboard of the cut area. I.e., adjacent to the section 202 which is to be removed. They also connect the TCX cord 224 to the old the old pair, outboard of the connection of the old cord 220. In connection of these two cords, it is extremely important that the cords be connected ring to ring, and tip to tip. When each of the splicers have made the connection and pressed "START", both analyzers will display "PLEASE STAND BY". A check of voltage, resistance, and capacitance is made for ring and tip to ground and between ring and tip to ensure no wire is connected to the new. Then the analyzer will cause the reeds of the relay to move to the new poles 216, thereby connecting the TCX cord to the new receptacle 22. Then, the routing board, upon direction of the CPU according to the program, will check the resistance at the master of ring to ring between the old and new receptacle, and tip to tip between the old and new receptacle. This will be the resistance from TCX receptacle 88 through the cords 224, to the ring connection, along the ring wire 200 and through the connection and cord 220 to its connection to the old receptacle 20. Therefore, if the connections are good electrical connections, the resistance will read a dead short or zero (0) resistance. Likewise, the tip to tip should read a zero resistance, and therefore, a check to see if an error in the connection has been made. If the master analyzer checks correctly, the program, as on the PROMS in the CPU will cause the slave analyzers to make the same check.

If the master analyzer does not check correctly, then both analyzers will display "MASTER CORD ERR", meaning that there has been an error in the master cord. Upon this display, the master splicer will recheck and reconnect his cords, and the resistance will be checked again. If the resistance checks good, the CPU will proceed to run the program. If it does not check good, it will repeat the display of "MASTER CORD ERR" for a recheck. The same procedure is done for the slave cords.

After these two checks are made, the analyzer will cause a tone to be placed upon the old wire by the slave and to be received by the old wire at the master. The amplitude is measured at the slave and at the master, and if these amplitudes correspond and match, then the analyzer goes forward. If they do not match, both analyzers display the message "OLD BUZZ ERR". Upon this message, both the master splicer and the slave splicer verify that they are attached to what has previously been identified as an old pair and correct their connections. If the buzz does not check correctly, this "OLD BUZZ ERR" will continue to be displayed until it is checked correct, and the analyzer will not permit proceeding until the tone amplitudes match as the master and slave analyzer.

When the old buzz test is confirmed; i.e., when the master and slave show a match, then the program proceeds to the next step which is to have the relay 212 to move the reeds to the old poles 214. Then, the master and old each display "CONNECT NEW".

With the command to "CONNECT NEW" both the master splicer and the slave splicer connect the new cord or white cord 222 to the new pair 206. Upon completion of this, each presses the "START" key. At that time, both analyzers display "PLEASE STAND BY".

Then the slave analyzer is commanded to place a tone between ring and tip on the new receptacle 22 into which the new or white cord 222 is connected. In addition to the tone, a +10 D.C. voltage is place ring to ground and a −10 D.C. voltage potential is placed tip to ground. With the reception of such a signal, at an equal level of power and voltage on the tone at slave and master, there will be a check at a high degree of certainty. If the tests do not check correct, there is a display upon both analyzers, the message "NEW BUZZ ERR". With this display, each of the splicers, master and slave investigate to correct the matter until the line does check satisfactorily.

After the new line does check satisfactorily, with relay 212 connecting the reeds to old poles, the analyzer displays "CUT OLD". At that time, each splicer cuts the old as described above and presses the "START" key. At this time, each analyzer displays "PLEASE STAND BY", and both relays are moved with the relays from old to new. Immediately thereafter, the check is made of the old section 206 as described in detail above. If the old section 206 does not check good as described above, each display displays "RESTORE LOOP ERR". With this display, old pair 200 is respliced, master and slave, and the cords removed, returning the cables to their original condition and the master and slave splicers start again from the first, i.e., at "WANT TO IDENTIFY". If the old pair buzz does check satisfactorily, then the analyzer displays "SPLICE NEW". At this time, both the master and slave splicer splice the new to the old as discussed above and press "START".

At this time, each analyzer displays "REMOVE OLD ONLY". Both the master and slave splicer remove the old cord 220 from the old pair 200 and press "START". At this time, each analyzer displays "PLEASE STAND BY" and the CPU causes a check at the master analyzer by capacitance, for the amount of wire connected to old receptacle 20. If it shows anything but a very short piece (the cord 220 itself) an indication of "BLK:ERROR MASTER" is displayed on both screens. The master splicer would correct the error and press "START" whereon the program would proceed so that the slave analyzer would check for wire on the old. This test would be the same as was conducted for the master with the same corrective measures, except the display would read "BLK:ERROR SLAVE".

After both analyzers have checked to be assured that there is no wire connected to either of the old connectors, then the reeds 218 move from the new poles 216 to the old poles 214. Then, a resistance test is made between the old receptacle 20 and the new receptacle 22 (connected by relay 212 to the TCX or reed cord 224). Unless this resistance measurement measures a dead short, the reeds return to the new position and each analyzer displays the message "MASTER SPLICER ERR". Therefore, the master splicer would resplice the splice he had previously made and press "START", and again, the test would be made to determine that there was a good, sound electrical splice with a dead short between the measurement points. After this is done, the CPU would cause the program to advance so that the same splice test was made on the slave unit. This test would be the same as was conducted at the master unit with an error being displayed as "SLAVE SPLICE ERR". The splice test interrupts the circuit no longer than the old section 202 test described above, i.e., less than 500 milliseconds.

When both of the splices have been check good, each analyzer displays "REMOVE CORDS". Each splicer will remove the cords and press "START". Upon pressing "START", this time the slave unit will display "PLEASE STAND BY", and the master unit will display "SEL START OR STOP". This means to select either start or stop.

If the master splicer presses the "START" key, the program will return to display "WANT TO IDENTIFY" on the master unit while still displaying "PLEASE STAND BY" on the slave. I.e., the entire sequence will begin again for the transfer of another pair.

If the master splicer presses the "STOP" key, each analyzer will display "COMPUTER STOP". After this display, both master splicer and slave splicer, may turn the analyzers 10M and 10S off by the on/off switch 74, pack up, and go home.

The embodiment shown and described above is only exemplary. We do not claim to have invented all the parts, elements or steps described. Various modifications can be made in the construction, material, arrangement, and operation, and still be within the scope of our invention.

The limits of the invention and the bounds of the patent protection are measured by and defined in the following claims. The restrictive description and drawing of the specific examples above do not point out what an infringement of this patent would be, but are to enable a person with ordinary skill in the art to make and use the invention.

In this regard, Applicant recognizes that certain program steps have not been included. E.g., Applicant has not described the resetting or erasing of entries into the RAMS at the point they are no longer needed.

As an aid to correlating the terms of the claims to the exemplary drawing, the following catalog of elements and steps is provided:

Elements

10 Analyzer
12 Batteries
14 Wall transformer
15 Power Supply
16 Old Plug Connector
18 New Plug Connector
20 Old Receptacle
22 New Receptacle
24 Old Ribbon
26 Old Pair Selector Board
28 New Ribbon
30 New Pair Selector Board
32 Routing Board
34 Old Buss
36 New Buss
38 Bridge Board
40 Central Processing Unit (CPU)
42 Data Buss
43 Volt Meter
44 Port Buss
45 Ohmmeter
46 Meter and Converter
47 Capacitance Meter
48 Key Pad
50 Display Driver
52 Pin Ribbon
54 Front Panel Control
55 Wires
56 Old Pair Selector Dial
58 New Pair Selector Dial
60 Reset Membrane Switch
62 Visual Display Board
64 Printer
66 Generator
68 Probe Receptacle
70 Fast Switch Circuit
72 Ground Lug
74 On/Off Switch
76 Volume Control
80 Talk Lugs
82 Talk and Data Receptacle
84 Battery Charge Receptacle
86 Cord Storage Pocket
88 TCX Receptacle
200 Old Pair
202 Old Section
204 New Section
206 New Pair
208 Master End
210 Slave End
212 Relay
214 Old Poles
216 New Poles
218 Reed Contacts
220 Old Cord
222 New Cord
224 Reed Cord
226 Data Link
M-Master
S-Slave Steps 100 V:RG
102 PRINT
104 V:TG
106 PRINT
108 PRINT
110 R:TG
112 PRINT
114 V:RG
116 PRINT
118 V:TG
120 PRINT
122 R:RG
124 PRINT
126 R:TG
128 PRINT
130 R:RT
132 PRINT
134 C:RG
136 C:TG
138 PRINT
140 C:RG

I claim as my invention:

1. The process involving transferring a communication circuit from
   a. an old section of a pair of wires to a new section of a pair of wires,
   b. one end of the old section and new section being adjacent to each other and designated as the master end and
   c. the other end of each section being adjacent and designated as the slave end, d. each pair of wires having one designated as ring and the other as tip;

e. wherein the improved method comprises the steps of:

f. placing a master double pole double throw relay at the master end, one pair of the poles designated as old poles and one pair of poles designated as new poles, each pair having a ring pole and a tip pole, and the reed contacts designated as ring reed and tip reed, ii. placing a slave double pole double throw relay at the slave end, one pair of the poles designated as old poles and one pair of poles designated as new poles, each pair having a ring pole and a tip pole, and the reed contacts designated as ring reed and tip reed, g.
  i. connecting the master relay old pair of poles to the old pair master end inboard thereof, ring pole to ring and tip pole to tip;
  ii. connecting the slave relay old pair of poles to the slave end of an old pair believed to be the same pair as to which the master relay is connected, inboard thereof, ring pole to ring and tip pole to tip;

h.
  i. connecting the master relay reed contacts to the master end of the old pair, outboard thereof, ring reed to ring and tip reed to tip;
  ii. connecting the slave relay reed contacts to the slave end of the old pair to which the slave poles are connected, outboard thereof, ring reed to ring and tip reed to tip;

j.
  i. connecting the master relay new pair of poles to the master end of the new pair, ring pole to ring and tip pole to tip;
  ii. connecting the slave relay new pair of poles to the slave end of the new pair, ring pole to ring and tip pole to tip;

k. with each of the master and slave relay reeds contacting the old pair of poles,
  i. cutting each of the wires of the old pair at the master end between the pole and reed connections,
  ii. cutting each of the wire of the old pair at the slave end between the pole and reed connections, l. after the both wires have been cut on both ends of the old cable pair, simultaneously moving the reeds of the master and slave relays from the old poles to the new poles, then m.
  i. splicing the new pair at the master end to the old pair at the reed connection, ring to ring and tip to tip,
  ii. splicing the new pair at the slave end to the old pair at the reed connection, ring to ring and tip to tip, and finally, n. disconnecting the wires from the master and slave relays.

2. The invention as defined in claim 1 having all the limitations a. through n. wherein the connection of the the new section pair to the new pair poles of each of the relays is made by the following steps:

o. clipping a white cord pair to the new pair at each of the master and slave ends, each cords being connected to an analyzer, then at one analyzer, p. applying special voltages and tones to the white cord pair, and q. measuring the voltage and tone amplitudes of the white cord pair at the other analyzer, and r. comparing the voltage and tones for a match, and s. displaying a visual indication at each of the analyzers of the result of the match comparison.

3. The invention as defined in claim 1 having all the limitations a. through n. wherein the connection of the old section pair to the old poles and to the read contacts of each of the relays is made by the following steps:

o. before the new section pair have been connected, moving the reeds to the new pole position, then, p.
  i. clipping a black cord pair to the old section pair at each of the master and slave ends, and
  ii. clipping a reed cord pair to the old section pair outboard of the black cord at each of the master and slave ends, q. connecting the reed cord to the reed connections of the relay and connecting the old pair to the old poles of the relay, each relay in an analyzer, r.
  i. measuring the resistance between the reed cord and the black cord ring to ring at the master end, and if the resistance does not show a dead short, so indicating, and
  ii. measuring the resistance between the reed cord and black cord tip to tip at the master end, and if the resistance does not show a short so indicating, and if the resistance ring to ring and tip to tip do show a dead short at the master end, s. also measuring the resistance between the black and reed cords, ring to ring and tip to tip at the slave end, and if the resistances do not show a dead short so indicating; and if the resistances do all show a dead short, and t. moving the reeds to the old pole position.

4. The invention as defined in claim 3 having all the limitations a. through t. with the addition of, after the resistance checks a dead short:

u. applying a tone at one of the analyzers to the black cord and measuring the amplitude of the tone from the analyzer wherein this tone is sent, and v. measuring the amplitude of the tone at the other analyzer at the black cord, and w. comparing the amplitude measurement from each analyzer, and x. displaying a visual indication at each of the analyzers of the results of the tone match comparison.

5. The invention as defined in claim 1 having all the limitations a. through n. wherein immediately after moving the reeds of the master and slave relays as defined in step 1. above:

o. applying special voltages and tones to the ring and tip of the old section pair connected to the old poles at one relay, and p. measuring the voltages and tone amplitudes of the ring and tip of the old pair connected to the old poles at the other relay, and if the measured voltage and tone amplitude do not match that applied, immediately q. removing the voltages and tone, and r. moving the reeds of both relays back to the old poles.

6. The invention as defined in claim 5 having all the limitations a. through r. with the additional limitations of:

s. displaying a first visual indication if the measurements matched, and
t. displaying a second visual indication if the measurements did not match.

7. The invention as defined in claim 1 having all the limitations a. through n. with the addition of the following steps which are performed after the splicing at the master and slave end and before the wires are disconnected:
- o. measuring the resistance at the master end between the old pole and the reed connection, ring to ring and tip to tip, and if the resistance is anything other than a dead short, then
- p. moving the reeds of the master relay from the new pole position back to the old pole position, and
- q. displaying a visual indication of the result of the resistance measurement at each of the analyzers.

8. The invention as defined in claim 7 having all the limitations a. through q. with the addition of the following steps which are performed after the resistance check defined above and before disconnecting the wires:
- r. measuring the resistance at the slave end between the old pole and the reed connection, ring to ring and tip to tip, and if the resistance is anything other than a dead short, then
- s. moving the reeds of the master relay from the new pole position back to the old pole position, and
- t. displaying a visual indication of the result of the resistance measurement at each of the analyzers.

9. The invention as defined in claim 8 having all the limitations a. through t. wherein time from moving the reeds from the old pole to the new pole and back to the old pole is less than 0.5 seconds.

10. A system for transferring a communication circuit from
- a. a section of an old pair of wires to
- b. a section of a new pair of wires.
- c. one end of the old and new section called a master end, and the other end called a slave end,
- d. wherein the improvement comprises:
- e. a master analyzer at the master end and a slave analyzer at the slave end, each analyzer having
- f. a routing circuit,
- g. a converter connected to the routing circuit,
- h. said converter including means for converting analog signals to binary digital signals,
- i. said routing circuit including means for routing a pair of wires to said converter, and
- j. a double pole-double throw relay,
- k. an old receptacle connected to the routing board and one pair of poles of the relay, and the old pair of wires,
- l. a new receptacle connected to the routing board and the other pair of poles of the relay, and the new pair of wires,
- m. a reed receptacle connected to the reeds of the relay and to the old pair of wires, and
- n. a central processing unit connected to the routing circuit, and converter,
- o. said central processing unit including means for controlling the relay, the routing circuit, and converter.

* * * * *